United States Patent [19]

Tanaka

[11] Patent Number: 5,349,005
[45] Date of Patent: Sep. 20, 1994

[54] THERMOPLASTIC ELASTOMER COMPOSITION

[75] Inventor: Terutaka Tanaka, Yokkaichi, Japan

[73] Assignee: Advanced Elastomer Systems, L.P., St. Louis, Mo.

[21] Appl. No.: 828,941

[22] PCT Filed: Jun. 11, 1991

[86] PCT No.: PCT/JP91/00779

§ 371 Date: Feb. 6, 1992

§ 102(e) Date: Feb. 6, 1992

[87] PCT Pub. No.: WO91/19764

PCT Pub. Date: Dec. 26, 1991

[30] Foreign Application Priority Data

Jun. 12, 1990 [JP] Japan .................. 2-153784
Jun. 12, 1990 [JP] Japan .................. 2-153785

[51] Int. Cl.$^5$ .................. C08L 23/16; C08L 23/26
[52] U.S. Cl. .................. 524/490; 524/484; 524/485; 524/486; 524/491; 525/88; 525/240; 525/331.7
[58] Field of Search .............. 524/490, 491, 484, 485, 524/486; 525/88, 331.7, 240

[56] References Cited

U.S. PATENT DOCUMENTS

| | | | |
|---|---|---|---|
| 3,402,140 | 9/1968 | Bickel et al. | 524/490 |
| 3,709,848 | 1/1973 | Gerstin | 525/211 |
| 4,059,651 | 11/1977 | Smith, Jr. | 268/848 |
| 4,130,535 | 12/1978 | Coran et al. | 260/33.6 |
| 4,220,579 | 9/1980 | Rinehart | 524/525 |
| 4,251,646 | 2/1981 | Smith, Jr. | 525/88 |
| 4,272,431 | 6/1981 | Schepers | 260/42.46 |
| 4,311,628 | 1/1982 | Abdou-Sabet et al. | 260/33.6 |
| 4,480,065 | 10/1984 | Kawai et al. | 525/88 |
| 4,480,074 | 10/1984 | Wang | 525/194 |
| 4,650,830 | 3/1987 | Yonekura et al. | 525/193 |
| 4,745,149 | 5/1988 | Eisele et al. | 524/505 |
| 4,777,203 | 10/1988 | Kawamura et al. | 524/505 |
| 5,116,902 | 5/1992 | Chapman et al. | 524/490 |

FOREIGN PATENT DOCUMENTS

| | | |
|---|---|---|
| 0216193 | 3/1987 | European Pat. Off. . |
| 2365601 | 3/1978 | France . |
| 59-221346 | 12/1984 | Japan . |
| 61-247747 | 11/1986 | Japan . |

*Primary Examiner*—Paul R. Michl
*Assistant Examiner*—Olga Asinovsky
*Attorney, Agent, or Firm*—William A. Skinner

[57] ABSTRACT

An olefin thermoplastic elastomer composition prepared by subjecting a composition comprising (a) 100 parts by weight of an ethylene-α-olefin-non-conjugated diene copolymer rubber having a high molecular weight, the Mooney viscosity (ML 1+4, at 125° C.) of a composition consisting of 100 parts by weight of the copolymer rubber and 75 parts by weight of a mineral oil-type softening agent being 40 or more, (b) from 10 to 500 parts by weight of a crystalline ethylene-propylene block copolymer resin having a melt flow rate of 10 to 50, (c) from 3 to 300 parts by weight of a mineral oil-type softening agent, and (d) from 5 to 100 parts by weight of a low-molecular-weight propylene homopolymer resin having a number-average molecular weight of 2000 to 20000, the weight ratio of the low-molecular-weight propylene homopolymer resin to the crystalline ethylene-propylene block copolymer resin being 0.8 or less, to dynamic vulcanization using, as a vulcanizing agent, from 0.5 to 15 parts by weight of a reactive alkylphenol-formaldehyde resin to vulcanize the ethylene-α-olefin-non-conjugated diene copolymer rubber to a high degree.

9 Claims, No Drawings

THERMOPLASTIC ELASTOMER COMPOSITION

TECHNICAL FIELD

This invention relates to a thermoplastic elastomer composition, and more particularly to a thermoplastic elastomer composition which has improved and well-balanced injection moldability, mechanical properties with low anisotropy, shape recoverability (e.g. compression set) at high temperatures and resistance to oils, and is suitably used for those parts of automobiles and industrial machines which are required to have high functions.

BACKGROUND ART

Olefin thermoplastic elastomer compositions composed of an olefin rubber and a crystalline olefin resin are excellent in flexibility and resistances to thermal aging and weather.

It is, however, unsuitable to use the conventionally known olefin thermoplastic elastomer compositions as high-functional materials. This is because most of the elastomer compositions are materials which are partially vulcanized by an organic peroxide, so that their oil resistance as well as their shape recoverability at high temperatures, such as compression set, are not satisfactorily high. Furthermore, the vulcanization using an organic peroxide brings about not only vulcanization of the olefin rubber but also crosslinking or cleavage of molecules of the crystalline olefin resin. For this reason, it is difficult to vulcanize the olefin rubber to a high degree, and the resulting elastomer composition is to have poor mechanical properties.

To improve the above shortcomings, a method in which a reactive alkylphenol-formaldehyde resin (hereinafter referred to as a phenol-type vulcanizing agent) is employed as a vulcanizing agent has been proposed as disclosed in Japanese Patent Publication No. 58-46138 and Japanese Laid-Open Patent Publication No. 59-91142.

According to the above method, only the double bonds in an ethylene-$\alpha$-olefin-non-conjugated diene copolymer rubber are selectively reacted with the phenol-type vulcanizing agent, so that the state of vulcanization can be significantly improved. The copolymer rubber can thus be vulcanized to a high degree which cannot be attained when an organic peroxide is used as a vulcanizing agent, and the resulting elastomer composition has drastically improved oil resistance and shape recoverability at high temperatures.

Thanks to the above method, the olefin thermoplastic elastomer compositions became usable as substitutes for synthetic rubbers, such as chloroprene rubber, chlorosulfonated polyethylene rubber, ethylene-propylenediene copolymer rubber and acrylonitrile-butadiene copolymer rubber, which have been conventionally used in the fields requiring high functionality, such as parts of automobiles and industrial machines.

However, since the olefin thermoplastic elastomer compositions vulcanized by the phenol-type vulcanizing agent have low fluidity, they are poor in injection moldability. In particular, in the production of thin moldings there is a problem of poor filling in a mold.

Moreover, the injection moldings of the above elastomer compositions have high anisotropy in mechanical properties. The moldings therefore tend to have, depending on their shapes, a portion of remarkably inferior properties in terms of, e.g., tensile strength and elongation at break. Such moldings are not suited for practical use.

DISCLOSURE OF INVENTION

An object of this invention is to provide an olefin thermoplastic elastomer composition which is free from the above-described shortcomings and has excellent properties.

Thus, the present invention provides, as a first embodiment, an olefin thermoplastic elastomer composition prepared by subjecting a composition comprising (a) 100 parts by weight of an ethylene-$\alpha$-olefin-non-conjugated diene copolymer rubber having a high molecular weight, the Mooney viscosity (ML 1+4, at 125° C.) of a composition consisting of 100 parts by weight of the copolymer rubber and 75 parts by weight of a mineral oil-type softening agent being 40 or more, (b) from 10 to 500 parts by weight of a crystalline ethylene-propylene block copolymer resin having a melt flow rate of 10 to 50, (c) from 3 to 300 parts by weight of a mineral oil-type softening agent, and (d) from 5 to 100 parts by weight of a low-molecular-weight propylene homopolymer resin having a number-average molecular weight of 2000 to 20000, the weight ratio of the low-molecular-weight propylene homopolymer resin to the crystalline ethylene-propylene block copolymer resin being 0.8 or less, to dynamic vulcanization using, as a vulcanizing agent, from 0.5 to 15 parts by weight of a reactive alkylphenol-formaldehyde resin to vulcanize the ethylene-$\alpha$-olefin-non-conjugated diene copolymer rubber to a high degree.

The present invention provides, as a second embodiment, an olefin thermoplastic elastomer composition comprising 100 parts by weight of the below-defined first component, and from 2 to 30 parts by weight of the below-defined second component:

first component: an olefin thermoplastic elastomer prepared by subjecting a composition comprising (a) 100 parts by weight of an ethylene-$\alpha$-olefin-non-conjugated diene copolymer rubber having a high molecular weight, the Mooney viscosity (ML 1+4, at 125° C.) of a composition consisting of 100 parts by weight of the copolymer rubber and 75 parts by weight of a mineral oil-type softening agent being 40 or more, (b) from 10 to 500 parts by weight of a crystalline ethylene-propylene block copolymer resin having a melt flow rate of 10 to 50, and (c) from 3 to 300 parts by weight of a mineral oil-type softening agent to dynamic vulcanization using, as a vulcanizing agent, from 0.5 to 15 parts by weight of a reactive alkylphenol-formaldehyde resin to vulcanize the ethylene-$\alpha$-olefin-non-conjugated diene copolymer rubber to a high degree; and second component: (d) a low-molecular-weight propylene homopolymer resin having a number-average molecular weight of 2000 to 20000.

BEST MODE FOR CARRYING OUT THE INVENTION

The thermoplastic elastomer composition according to the first embodiment of the present invention (hereinafter referred to simply as Composition (A)) can be prepared by subjecting a composition comprising an ethylene-$\alpha$-olefin-non-conjugated diene copolymer rubber (Component (a)), a crystalline ethylene-propylene block copolymer resin (Component (b)), a mineral oil-type softening agent (Component (c)), and a low-molecular-weight propylene homopolymer resin (Component (d)) to dynamic vulcanization using a reactive alkylphenol-formaldehyde resin as a vulcanizing agent.

On the other hand, the thermoplastic elastomer composition according to the second embodiment of the present invention (hereinafter referred to simply as Composition (B)) can be prepared in the following manner: a composition comprising the above Components (a), (b) and (c) is firstly subjected to dynamic vulcanization using a reactive alkylphenol-formaldehyde resin as a vulcanizing agent to vulcanize the ethylene-α-olefin-non-conjugated diene copolymer rubber to a high degree. The olefin thermoplastic elastomer thus obtained is then mixed with the low-molecular-weight propylene homopolymer resin (Component (d)) to give the subject elastomer composition.

The α-olefin in the ethylene-α-olefin-non-conjugated diene copolymer rubber, Component (a), preferably has from 3 to 15 carbon atoms. Examples of the non-conjugated diene in Component (a) include dicyclopentadiene, 1,4-hexadiene, ethylidenenorbornene and methylidenenorbornene. In the present invention, propylene and ethylidenenorbornene are preferred as the α-olefin and the non-conjugated diene, respectively, because they are easily obtainable and are advantageous in the vulcanization rate. An ethylene-propylene-ethylidenenorbornene copolymer rubber is therefore preferred as the copolymer rubber, Component (a).

The weight ratio of ethylene/α-olefin in the copolymer rubber is from 50/50 to 90/10, preferably from 60/40 to 80/20. Further, the amount of the non-conjugated diene in the copolymer rubber is from 5 to 30, preferably from 10 to 20, as expressed by an iodine value.

The above copolymer rubber is required to have a high molecular weight so that the final elastomer composition can be imparted with good mechanical properties. Specifically, it is necessary that the Mooney viscosity (ML 1+4, at 125° C.) of a composition consisting of 100 parts by weight of the copolymer rubber and 75 parts by weight of a mineral oil-type softening agent be 40 or more.

The crystalline ethylene-propylene block copolymer resin, Component (b), is required to have a certain degree of high fluidity. Namely, it is necessary that the melt flow rate (MFR) of the copolymer resin be in the range of 10 to 50 when measured in accordance with Japanese Industrial Standard (JIS) K7210 (at 230° C., loaded with 2.16 kg). When the above-specified copolymer resin is used, compatibility between the copolymer rubber having a high molecular weight, Component (a), and the copolymer resin, Component (b), is greatly increased. As a result, these two polymers can be thoroughly admixed even when the fluidities of the polymers are considerably different from each other.

In the case where the MFR of the crystalline ethylene-propylene block copolymer resin is lower than 10, the resulting elastomer composition cannot have sufficiently high fluidity. On the other hand, when the MFR is higher than 50, the resulting elastomer composition has poor mechanical properties.

In the present invention, from 10 to 500 parts by weight, preferably from 20 to 400 parts by weight, of the crystalline ethylene-propylene block copolymer resin is used for 100 parts by weight of the ethylene-α-olefin-non-conjugated diene copolymer rubber. When the amount of the copolymer resin is less than 10 parts by weight for 100 parts by weight of the copolymer rubber, the resulting elastomer composition has low fluidity, and good moldings cannot be successfully obtained therefrom. When the amount of the copolymer resin is more than 500 parts by weight, the hardness of the final elastomer composition becomes unacceptably high, and thus the desired flexibility cannot be obtained.

To impart flexibility to the resulting elastomer compositions, and to improve fluidity thereof, the mineral oil-type softening agent, Component (c), is used in the present invention. A paraffin-type mineral oil is preferable as the mineral oil-type softening agent from the view point of resistances to heat and weather.

From 3 to 300 parts by weight of the mineral oil-type softening agent is used for 100 parts by weight of the ethylene-α-olefin-non-conjugated diene copolymer rubber. The use of more than 300 parts by weight of the mineral oil-type softening agent is unfavorable because the resulting elastomer composition has poor mechanical properties and also suffers from bleeding of the mineral oil. Such an elastomer composition is practically unusable. On the other hand, less than 3 parts by weight of the softening agent cannot provide sufficiently high fluidity to the resulting elastomer composition.

The mineral oil-type softening agent may be incorporated into the copolymer rubber in advance. It may also be added during dynamic vulcanization, or before or after conducting the dynamic vulcanization. Moreover, the combination of the above manners is also acceptable.

The phenol-type vulcanizing agent for use in the present invention is a compound having the following formula:

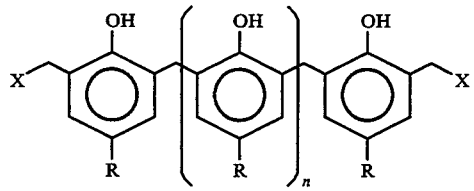

wherein n is an integer of 0 to 10, X is a hydroxyl group or a halogen atom, and R is a saturated hydrocarbon group having 1 to 15 carbon atoms.

The above compound has been generally employed as a vulcanizing agent for rubbers as described in U.S. Pat. Nos. 3,287,440 and 3,709,840, and can be prepared by a condensation polymerization reaction between substituted phenol and aldehyde in an alkaline medium.

The amount of the vulcanizing agent is from 0.5 to 15 parts by weight, preferably from 1 to 10 parts by weight, and more preferably from 3 to 8 parts by weight, for 100 parts by weight of the ethylene-α-olefin-non-conjugated diene copolymer rubber. When the amount of the vulcanizing agent is less than 0.5 parts by weight, the copolymer rubber cannot be vulcanized to a high degree when dynamic vulcanization is conducted. As a result, the resulting elastomer composition cannot have sufficiently high oil resistance and shape recoverability at high temperatures. When more than 15 parts by weight of the vulcanizing agent is employed, the flexibility of the resulting elastomer composition is impaired.

The vulcanizing agent can be used singly. However, a vulcanization accelerator can be used together with the vulcanizing agent for the purpose of controlling the vulcanization rate. Examples of the vulcanization accelerator usable in the present invention include metal halides such as stannous chloride and ferric chloride, and organic halides such as chlorinated polypropylene, butyl bromide rubber and chloroprene rubber. In the case where the vulcanization accelerator is used along with the vulcanizing agent, it is preferable to co-employ a metal oxide such as zinc oxide.

The term "dynamic vulcanization" herein means that the ethylene-α-olefin-non-conjugated diene copolymer rubber is vulcanized while mixing and kneading the copolymer rubber with the other components.

The dynamic vulcanization is preferably conducted in accordance with the method described in Japanese Patent Publication No. 55-46138.

Thus, the ethylene-α-olefin-non-conjugated diene copolymer rubber and a proper amount of the mineral oil-type softening agent are added to the crystalline ethylene-propylene block copolymer resin, and mixed, in general, at a temperature at which the block copolymer resin is melted, or higher (generally from 160° to 250° C.). While kneading, the alkylphenol-type vulcanizing agent is then added to the mixture, and the kneading is further continued to conduct dynamic vulcanization.

For carrying out the dynamic vulcanization, use may be made of any one of batch-type kneading machines such as a banbury mixer, heating rollers and various kneaders, and continuous-type kneading machines such as a single-screw extruder and a double-screw extruder.

The ethylene-α-olefin-non-conjugated diene copolymer rubber is vulcanized to a high degree by the above dynamic vulcanization. The expression "the copolymer rubber is vulcanized to a high degree" herein means that only less than 5 wt. % of non-vulcanized ethylene-α-olefin-non-conjugated diene copolymer rubber is extracted with hot xylene from the ethylene-α-olefin-non-conjugated diene copolymer rubber contained in the final thermoplastic elastomer composition.

As described above, the vulcanization degree is determined by the vulcanized rate of the ethylene-α-olefin-non-conjugated diene copolymer rubber contained in the olefin thermoplastic elastomer composition. Therefore, among the components extracted with hot xylene, it is necessary to pay regard to that of the ethylene-α-olefin-non-conjugated diene copolymer rubber only, and the other components can be neglected.

Details of the extraction method using hot xylene will be described later.

According to the present invention, if desired, the crystalline ethylene-propylene block copolymer resin and the mineral oil-type softening agent may be further added, within the scope of the present invention, to the mixture vulcanized by the above-described dynamic vulcanization. Processing aids such as a filler, an antioxidant, a copper inhibitor, a coloring agent, an ultraviolet absorber and a lubricant may be added before or after conducting the dynamic vulcanization, or together with the above-mentioned optional crystalline ethylene-propylene block copolymer or the like which may be added after the dynamic vulcanization is completed.

In the case of Composition (A), a low-molecular-weight propylene homopolymer resin (Component (d)) having a number-average molecular weight of 2000 to 20000 is added to the mixture of Components (a), (b) and (c), and the resulting mixture is subjected to the dynamic vulcanization. In the case of Composition (B), the propylene homopolymer resin is used as a second component to be mixed with a first component which is an olefin thermoplastic elastomer obtained by subjecting Components (a), (b) and (c) to the dynamic vulcanization. In either case, the use of the propylene homopolymer resin imparts improved fluidity to the resulting elastomer composition, so that moldings can be easily obtained from the elastomer composition. Furthermore, anisotropy in mechanical properties of the moldings can be reduced.

It is unfavorable to use a propylene homopolymer resin having a number-average molecular weight of less than 2000 because the resin bleeds out of the resulting thermoplastic elastomer composition. When the number-average molecular weight is more than 20000, the anisotropy-reducing effect produced will be insufficient.

In Composition (A) of the present invention, from 5 to 100 parts by weight, preferably from 10 to 50 parts by weight, of the low-molecular-weight propylene homopolymer resin is used for 100 parts by weight of the ethylene α-olefin-non-conjugated diene copolymer rubber. When the amount of the propylene homopolymer resin is less than 5 parts by weight, the anisotropy reducing effect cannot be sufficiently high. On the other hand, when the amount of the propylene homopolymer resin is more than 100 parts by weight, the resulting elastomer composition has extremely poor mechanical properties.

Furthermore, in the case of Composition (A), it is necessary that the ratio of low-molecular-weight propylene homopolymer resin/crystalline ethylene-propylene block copolymer resin be 0.8 or less. When this ratio is higher than 0.8, a difference in the viscosities between the copolymer rubber, and a mixture of the propylene homopolymer resin and the crystalline ethylene-propylene block copolymer resin, during the course of dynamic vulcanization, becomes too large. As a result, the copolymer rubber cannot be thoroughly dispersed in the mixture in the dynamic vulcanization and, therefore a thermoplastic elastomer composition having good properties cannot be obtained.

In the case of Composition (B), on the other hand, from 2 to 30 parts by weight of the low-molecular-weight propylene homopolymer resin is used for 100 parts by weight of the olefin thermoplastic elastomer, the first component. When the amount of the propylene homopolymer resin is less than 2 parts by weight, the fluidity-improving effect and the anisotropy-reducing effect cannot be sufficiently exhibited. When the amount of the propylene homopolymer resin is more than 30 parts by weight, the mechanical properties of the resulting elastomer composition are considerably impaired.

High-shear kneading machines such as a banbury mixer, various kneaders and a double-screw extruder are preferably employed to mix the olefin thermoplastic elastomer and the low-molecular-weight propylene homopolymer resin, because a difference between the viscosity of the olefin thermoplastic elastomer and that of the propylene homopolymer resin is extremely large. A mixture of these two components is kneaded by the above kneading machine at a temperature of 160° C. to 240° C. The desired thermoplastic elastomer composition having good fluidity can thus be obtained.

The present invention will now be explained in more detail with reference to the following examples, which are given merely for illustration of the present invention and are not intended to be limiting thereof.

In the following examples, an injection-molded plate used for the evaluation of appearance was prepared under the following conditions. Measurements of various properties were conducted in the below-described manner.

Preparation of Injection-Molded Plate Used for Evaluation of Appearance
  (1) Shape Length: 20 cm, Width: 15 cm, Thickness: 2 mm
  (2) Mold Film gate type (Width: 15 mm, Thickness: 5 mm)
  (3) Molding Machine "Sumitomo Nestal Neomat SG 150" manufactured by Sumitomo Heavy Industries, Ltd. (mold tightening force: 120 t)
  (4) Molding Conditions Temperature of Cylinder (back): 180° C. Temperature of Cylinder (center): 190° C. Temperature of Cylinder (front): 200° C. Temperature of Nozzle: 200° C. Temperature of Mold: 40° C. Injection Pressure: 90% of maximum injection pressure Injection Rate: 50% of maximum injection rate Measurements of Properties
  (1) Hardness Measured in accordance with ASTM D-2240, using a durometer type A.
  (2) Tensile Test Measured in accordance with JIS K6301.

Test pieces were prepared by punching an injection-molded plate, using a dumbbell No. 3, in parallel with and vertically to the flow direction.
  (3) Compression Set Measured in accordance with JIS K6301, under the conditions of 100° C.×22 hours, with 25% compression.
  (4) Resistance to Oil Measured in accordance with JIS K6301.

A test piece with a size of 50 mm×25 mm×2 mm was immersed in a test oil No. 3 at 70° C. for 22 hours, and a change in weight of the test piece before and after the immersion was determined.
  (5) Melt Flow Rate Measured in accordance with JIS K7210.

The melt flow rate of a crystalline ethylene-propylene block copolymer resin was measured under the conditions of 230° C. and 2.16 kg, and that of an olefin thermoplastic elastomer composition was measured under the conditions of 230° C. and 5 kg.
  (6) The number-average molecular weight of a low-molecular-weight propylene homopolymer was determined by a measurement using GPC under the following conditions, and a calculation in terms of polystyrene. Apparatus: Waters 150C Column: "GMH-HT" manufactured by Toyo Soda Manufacturing Co., Ltd. Solvent: o-dichlorobenzene containing 0.2% of 3,5-di-t-butyl-4-hydroxy toluene as a stabilizer Temperature of Column: 140° C. Temperature of Inlet: 140° C.
  (7) The ratio of non-vulcanized copolymer rubber was determined by extraction with hot xylene in the following manner:

An olefin thermoplastic elastomer composition was formed into a thin film with a thickness of 0.1 mm or less using a press.

Approximately 1.5 g of the above film was accurately weighed (this weight is indicated by $W_1$), and then placed in 100 ml of boiling xylene, followed by stirring for 30 minutes. After cooling to room temperature, the resulting solution was subjected to filtration using a Teflon membrane filter with a thickness of 0.3μ.

The xylene in the filtrate was evaporated until the amount of the filtrate was reduced to approximately 5 cc. The filtrate was then placed in a centrifugal tube with the aid of 10 ml of cyclohexane, to which was added 10 ml of acetone, followed by centrifugal separation at a rotational speed of 10000 rpm for 15 minutes. The supernatant was removed, and the remaining portion was washed with a 1:1 mixed solvent of cyclohexane and acetone.

After thoroughly evaporating the solvents, the residue was weighed (this weight is indicated by $W_2$).

The same procedure as the above was repeated by using a crystalline propylene polymer. The weights corresponding to $W_1$ and $W_2$ are indicated by $W_3$ and $W_4$, respectively. The weight percentage of an ethylene-α-olefin-non-conjugated diene copolymer rubber in the olefin thermoplastic elastomer composition is indicated by $W_E$, and that of the crystalline propylene polymer in the elastomer composition is indicated by $W_P$.

The ratio E (%) of non-vulcanized copolymer rubber can be calculated from the following equation:

$$E(\%) = \frac{W_2 - \frac{W_1 \times W_4 \times W_P}{100 \times W_3}}{W_1 \times W_E} \times 10{,}000$$

It is noted that when an oil-extended ethylene-α-olefin-non-conjugated diene copolymer rubber which is an ethylene-α-olefin-non-conjugated diene copolymer rubber containing paraffin mineral oil is used, the weight of the paraffin mineral oil is excluded and only the weight percentage of the ethylene-α-olefin-non-conjugated diene copolymer rubber is indicated by $W_E$.

In the below-described examples were employed the following compounds:
  (1) An ethylene-propylene-ethylidenenorbornene copolymer rubber was used as the ethylene-α-olefin-non-conjugated diene copolymer rubber (hereinafter referred to simply as EPDM). The iodine value of the copolymer rubber was 15, and the ethylene content thereof was 60 wt. %. The Mooney viscosity (ML 1+4, at 125° C.) of a composition consisting of 100 parts by weight of the copolymer rubber and 75 parts by weight of a paraffin-type softening agent was 64.
  (2) The following compounds were respectively used as the crystalline ethylene-propylene block copolymer resins. The unit of the MFR is "g/100 min" (the same shall apply hereinafter).
    (i) MFR 20: "Block PP-1"
    (ii) MFR 40: "Block PP-2"
    (iii) MFR 5: "Block PP-3"
    (iv) MFR 60: "Block PP-4"
  (3) The following compounds were respectively used as the crystalline propylene homopolymer resins.
    (i) MFR 20: "Homo PP-1"
    (ii) MFR 40: "Homo PP-2"
  (4) The following compounds were respectively used as the low-molecular-weight propylene homopolymer resins.
    (i) Molecular weight 2000: "Low-molecular-weight PP-1"
    (ii) Molecular weight 15000: "Low-molecular-weight PP-2"
    (iii) Molecular weight 500: "Low-molecular-weight PP-3"

(iv) Molecular weight 50000: "Low-molecular-weight PP-4"

(5) A paraffin-type softening agent having a kinematic viscosity of 100 (cSt, at 40° C.) was used as the mineral oil-type softening agent.

(6) A dimethylol-p-octyl-phenol-formaldehyde resin was used as the phenol-type vulcanizing agent.

(7) Stannous chloride (SnCl$_2$.6H$_2$O) and zinc oxide were used as the vulcanization accelerators.

A: PREPARATION OF THERMOPLASTIC ELASTOMER COMPOSITION (A) and evaluation thereof Example A1

A mixture consisting of 40 parts by weight of "Block PP-1", 15 parts by weight of "Low-molecular-weight PP-1", 100 parts by weight of EPDM, 2 parts by weight of stannous chloride, 2 parts by weight of zinc oxide and 75 parts by weight of the paraffin-type softening agent was kneaded by a 3-liter banbury mixer at a temperature of 120° C., with a rotational speed of the rotor of 150 rpm.

When the temperature of the above mixture reached 170° C. due to the self-generating heat, the vulcanizing agent was added to the mixture, followed by further kneading for 3 minutes. To the resulting mixture was added 75 parts by weight of the paraffin-type softening agent, and kneading was continued for an additional 1 minute, thereby obtaining an olefin thermoplastic elastomer composition.

The properties of the elastomer composition thus obtained are shown in Table A1-2.

The data in Table A1-2 show that the molding prepared by subjecting the elastomer composition to injection molding has a good appearance, is excellent in mechanical properties, shape recoverability (compression set) and resistance to oil, and exhibits low anisotropy in mechanical properties. In addition, the melt flow rate (MFR) shown in the table demonstrates that the elastomer composition is excellent in fluidity.

Examples A2 to A7

Olefin thermoplastic elastomer compositions were prepared with the formulations shown in Table A1-1 and in the same manner as in Example A1.

The properties of the above-obtained elastomer compositions are shown in Table A1-2.

The data in Table A1-2 show that all the injection moldings have good appearances, are excellent in mechanical properties, shape recoverability (compression set) and resistance to oil, and exhibit low anisotropy in mechanical properties. In addition, the MFR values shown in the table demonstrate that the elastomer compositions are excellent in fluidity.

Comparative Examples A1 to A7

Olefin thermoplastic elastomer compositions were prepared with the formulations shown in Table A2-1 and in the same manner as in Example A1.

However, in Comparative Example A2, the vulcanizing agent was added to the mixture when the temperature thereof reached 160° C. This is because the self-generation of heat of the mixture was low.

The properties of the above-obtained elastomer compositions are shown in Table A2-2.

The molding prepared by subjecting the elastomer composition obtained in Comparative Example A1 to injection molding has a good appearance, and is excellent in mechanical properties, shape recoverability (compression set) and resistance to oil. However, the elastomer composition shows high anisotropy in mechanical properties, and has low fluidity.

In Comparative Example A2, EPDM was poorly dispersed in the mixture, so that an olefin thermoplastic elastomer composition was not able to be obtained.

Bleeding was caused on the molding prepared by subjecting the elastomer composition obtained in Comparative Example A3 to injection molding. The elastomer composition is thus practically unusable.

The molding prepared by subjecting the elastomer composition obtained in Comparative Example A4 to injection molding has a good appearance, and is excellent in mechanical properties, shape recoverability (compression set) and resistance to oil. However, the composition shows high anisotropy in mechanical properties.

The molding prepared by subjecting the elastomer composition obtained in Comparative Example A5 to injection molding has almost a good appearance, and is excellent in mechanical properties, shape recoverability (compression set) and resistance to oil. However, the composition shows high anisotropy in mechanical properties, and has low fluidity.

The molding prepared by subjecting the elastomer composition obtained in Comparative Example A6 to injection molding has a good appearance, and is excellent in shape recoverability (compression set) and resistance to oil. However, it has very poor mechanical properties.

The olefin thermoplastic elastomer composition obtained in Comparative Example A7 was quite brittle, and was not able to be subjected to injection molding.

Comparative Examples A8 to A11

Olefin thermoplastic compositions were prepared with the formulations shown in Table A3-1 and in the same manner as in Example A1.

The properties of the above-obtained thermoplastic compositions are shown in Table A3-2.

The molding prepared by subjecting the thermoplastic composition obtained in Comparative Example A8 to injection molding has a good appearance. However, it has high hardness and low flexibility.

Bleeding was remarkably caused on the molding prepared by subjecting the thermoplastic composition obtained in Comparative Example A9 to injection molding. In addition, the molding has extremely poor mechanical properties.

The moldings respectively prepared by subjecting the thermoplastic compositions obtained in Comparative Examples A10 and A11 to injection molding are excellent in shape recoverability (compression set) and resistance to oil. However, they are poor in elongation at break and fluidity. Moreover, the moldings have rough surfaces. The thermoplastic compositions are thus unsuitable for practical use.

TABLE A1-1

| Formulation (parts by weight) | Ex. A1 | Ex. A2 | Ex. A3 | Ex. A4 | Ex. A5 | Ex. A6 | Ex. A7 |
|---|---|---|---|---|---|---|---|
| EPDM | 100 | 100 | 100 | 100 | 100 | 100 | 100 |
| Block PP-1 | 40 | 40 | 150 | 250 | 450 |  | 40 |
| Block PP-2 |  |  |  |  |  | 40 |  |
| Low-molecular-weight PP-1 | 15 | 30 | 25 | 30 | 40 | 15 |  |
| Low-molecular-weight PP-2 |  |  |  |  |  |  | 15 |

TABLE A1-1-continued

| Formulation (parts by weight) | Ex. A1 | Ex. A2 | Ex. A3 | Ex. A4 | Ex. A5 | Ex. A6 | Ex. A7 |
|---|---|---|---|---|---|---|---|
| Paraffin-type softening agent | 150 | 150 | 150 | 150 | 150 | 150 | 150 |
| Phenol-type vulcanizing agent | 5 | 5 | 5 | 5 | 5 | 5 | 5 |
| $SnCl_2 \cdot 2H_2O$ | 2 | 2 | 2 | 2 | 2 | 2 | 2 |
| ZnO | 2 | 2 | 2 | 2 | 2 | 2 | 2 |

TABLE A1-2

| Properties | Ex. A1 | Ex. A2 | Ex. A3 | Ex. A4 | Ex. A5 | Ex. A6 | Ex. A7 |
|---|---|---|---|---|---|---|---|
| Hardness (SHORE) | 60A | 65A | 90A | 41D | 49D | 59D | 61A |
| Tensile strength ($kg/cm^2$) (parallel direction) | 42 | 44 | 100 | 120 | 155 | 39 | 40 |
| Tensile strength ($kg/cm^2$) (vertical direction) | 52 | 49 | 103 | 121 | 150 | 49 | 58 |
| Elongation at break (%) (parallel direction) | 320 | 350 | 500 | 540 | 600 | 330 | 320 |
| Elongation at break (%) (vertical direction) | 410 | 390 | 550 | 570 | 610 | 390 | 430 |
| Compression set (%) | 22 | 20 | 43 | 48 | 61 | 24 | 21 |
| Resistance to oil (wt. %) | 115 | 120 | 73 | 55 | 41 | 121 | 111 |
| Ratio of non-vulcanized rubber (wt. %) | 2.3 | 2.5 | 3.1 | 4.1 | 4.8 | 3.0 | 2.1 |
| MFR (g/10 min) | 4 | 26 | 42 | 51 | 68 | 15 | 2 |
| Appearance | good | good | good | good | good | good | good |

TABLE A2-1

| Formulation (parts by weight) | Comp. Ex. A1 | Comp. Ex. A2 | Comp. Ex. A3 | Comp. Ex. A4 | Comp. Ex. A5 | Comp. Ex. A6 | Comp. Ex. A7 |
|---|---|---|---|---|---|---|---|
| EPDM | 100 | 100 | 100 | 100 | 100 | 100 | 100 |
| Block PP-1 | 50 | 40 | 40 | 40 | | | 5 |
| Block PP-3 | | | | | 40 | | |
| Block PP-4 | | | | | | 40 | |
| Low-molecular-weight PP-1 | 3 | 80 | | | 15 | 15 | 15 |
| Low-molecular-weight PP-3 | | | 15 | | | | 15 |
| Low-molecular-weight PP-4 | | | | 15 | | | |
| Paraffin-type softening agent | 150 | 150 | 150 | 150 | 150 | 150 | 150 |
| Phenol-type vulcanizing agent | 5 | 5 | 5 | 5 | 5 | 5 | 5 |
| $SnCl_2 \cdot 2H_2O$ | 2 | 2 | 2 | 2 | 2 | 2 | 2 |
| ZnO | 2 | 2 | 2 | 2 | 2 | 2 | 2 |

TABLE A2-2

| Properties | Comp. Ex. A1 | Comp. Ex. A2 | Comp. Ex. A3 | Comp. Ex. A4 | Comp. Ex. A5 | Comp. Ex. A6 | Comp. Ex. A7 |
|---|---|---|---|---|---|---|---|
| Hardness (SHORE) | 58A | x | 59A | 62A | 60A | 59A | 50A |
| Tensile strength ($kg/cm^2$) (parallel direction) | 32 | x | 38 | 39 | 44 | 33 | x |
| Tensile strength ($kg/cm^2$) (vertical direction) | 61 | x | 45 | 60 | 70 | 35 | x |
| Elongation at break (%) (parallel direction) | 260 | x | 310 | 310 | 300 | 110 | x |
| Elongation at break (%) (vertical direction) | 450 | x | 390 | 450 | 410 | 190 | x |
| Compression set (%) | 20 | x | 22 | 19 | 17 | 25 | x |
| Resistance to oil (wt. %) | 110 | x | 118 | 110 | 91 | 121 | x |
| Ratio of non-vulcanized rubber (wt. %) | 2.4 | x | — | — | — | — | x |
| MFR (g/10 min) | 0.4 | x | 7 | 2 | 0.8 | 8 | x |
| Appearance | almost good | non-moldable | poor[1] | good | good | good | non-moldable |

(Note)
x: unmeasurable
—: not measured
[1] remarkable bleeding

TABLE A3-1

| Formulation (parts by weight) | Comp. Ex. A8 | Comp. Ex. A9 | Comp. Ex. A10 | Comp. Ex. A11 |
|---|---|---|---|---|
| EPDM | 100 | 100 | 100 | 100 |
| Block PP-1 | 600 | 40 | | |
| Homo PP-1 | | | 40 | |
| Homo PP-2 | | | | 40 |
| Low-molecular-weight PP-1 | 50 | 15 | 15 | 15 |
| Paraffin-type softening agent | 150 | 400 | 150 | 150 |
| Phenol-type vulcanizing agent | 5 | 5 | 5 | 5 |
| $SnCl_2 \cdot 2H_2O$ | 2 | 2 | 2 | 2 |
| ZnO | 2 | 2 | 2 | 2 |

TABLE A3-2

| Properties | Comp. Ex. A8 | Comp. Ex. A9 | Comp. Ex. A10 | Comp. Ex. A11 |
|---|---|---|---|---|
| Hardness (SHORE) | 62D | 21A | 66A | 66A |
| Tensile strength ($kg/cm^2$) (parallel direction) | 182 | 6 | 38 | 35 |
| Tensile strength ($kg/cm^2$) (vertical direction) | 171 | 8 | 49 | 41 |
| Elongation at break (%) (parallel direction) | 620 | 210 | 250 | 220 |
| Elongation at break (%) (vertical direction) | 450 | 270 | 310 | 290 |
| Compression set (%) | 89 | — | 22 | 23 |
| Resistance to oil (wt. %) | 30 | — | 81 | 83 |
| Ratio of non-vulcanized rubber (wt. %) | — | — | — | — |
| MFR (g/10 min) | 70 | — | 0.6 | 0.8 |
| Appearance | almost | poor[2] | poor[3] | poor[3] |

TABLE A3-2-continued

| Properties | Comp. Ex. A8 | Comp. Ex. A9 | Comp. Ex. A10 | Comp. Ex. A11 |
|---|---|---|---|---|
| | | good | | |

(Note)
—: not measured
[2]remarkable bleeding
[3]extremely rough surface

B: PREPARATION OF THERMOPLASTIC ELASTOMER COMPOSITION (B) AND EVALUATION THEREOF

In the following examples, a material prepared in the following manner was used as the olefin thermoplastic elastomer, the first component:

A mixture consisting of 100 parts by weight of EPDM, Block PP or Homo PP in an amount shown in Table B1, 2 parts by weight of stannous chloride, 2 parts by weight of zinc oxide and 75 parts by weight of the paraffin-type softening agent was kneaded by a 3-liter banbury mixer at a temperature of 120° C., with a rotational speed of the rotor of 150 rpm.

When the temperature of the above mixture reached 170° C. due to the self-generation of heat, the vulcanizing agent was added to the mixture, followed by kneading for additional 3 minutes. To the resulting mixture was added 75 parts by weight of the paraffin-type softening agent, and kneading was continued for an additional one minute, thereby obtaining an olefin thermoplastic elastomer.

The properties of the thermoplastic elastomers thus obtained are shown in Table B1.

Examples B1 to B4

Olefin thermoplastic elastomer compositions were respectively prepared by kneading the olefin thermoplastic elastomer and "Low-molecular-weight PP", with the formulations shown in Table B2. The kneading was carried out by a same-direction double-screw extruder (screw diameter: 40 mm, L/D = 32) at a temperature of 170° C. to 190° C., with a screw rotational speed of 200 rpm.

The properties of the above-obtained elastomer compositions are shown in Table B2.

The data in Table B2 show that all the moldings prepared by subjecting the elastomer compositions to injection molding have good appearances, are excellent in mechanical properties, shape recoverability (compression set) and resistance to oil, and exhibit low anisotropy in mechanical properties. In addition, the MFR values shown in the table demonstrate that the elastomer compositions are excellent in fluidity.

Comparative Examples B1 to B5

Olefin thermoplastic elastomer compositions were prepared with the formulations shown in Table B3 and in the same manner as in Example B1.

The properties of the above-obtained elastomer compositions are shown in Table B3.

The moldings prepared by subjecting the elastomer compositions prepared in Comparative Examples B1 and B3 to injection molding have good appearances, and are excellent in mechanical properties, shape recoverability (compression set) and resistance to oil. However, the elastomer compositions show high anisotropy in mechanical properties, and have low fluidity.

The molding prepared by subjecting the elastomer composition prepared in Comparative Example B2 to injection molding has poor mechanical properties, and has a rough surface. The elastomer composition is thus practically unusable.

The moldings prepared by subjecting the elastomer compositions prepared in Comparative Examples B4 and B5 to injection molding have good appearances, and are excellent in mechanical properties, shape recoverability (compression set) and resistance to oil. However, they have high anisotropy in mechanical properties.

TABLE B1

| | Elastomer 1 | Elastomer 2 | Elastomer 3 | Elastomer 4 |
|---|---|---|---|---|
| Formulation (parts by weight) | | | | |
| EPDM | 100 | 100 | 100 | 100 |
| Block PP-1 | 40 | 250 | | |
| Block PP-3 | | | 40 | |
| Homo PP-1 | | | | 40 |
| Paraffin-type softening agent | 150 | 150 | 150 | 150 |
| Phenol-type vulcanizing agent | 5 | 5 | 5 | 5 |
| SnCl$_2$.2H$_2$O | 2 | 2 | 2 | 2 |
| ZnO | 2 | 2 | 2 | 2 |
| Properties | | | | |
| Hardness (SHORE) | 55A | 39D | 55A | 60A |
| Tensile strength (kg/cm$^2$) (parallel direction) | 31 | 118 | 35 | 32 |
| Tensile strength (kg/cm$^2$) (vertical direction) | 62 | 140 | 68 | 51 |
| Elongation at break (%) (parallel direction) | 260 | 500 | 220 | 180 |
| Elongation at break (%) (vertical direction) | 460 | 580 | 430 | 320 |
| Compression set (%) | 20 | 46 | 19 | 16 |
| Resistance to oil (wt. %) | 102 | 51 | 93 | 75 |
| Ratio of non-vulcanized rubber (wt. %) | 2.3 | 4.1 | 2.5 | 1.1 |
| MFR (g/10 min) | 0.4 | 29 | 0.2 | 0.3 |
| Appearance | good | good | almost good | poor[1] |

(Note)
[1]extremely rough surface

TABLE B2

| | Ex. B1 | Ex. B2 | Ex. B3 | Ex. B4 |
|---|---|---|---|---|
| Formulation (parts by weight) | | | | |
| Elastomer 1 | 100 | 100 | | 100 |
| Elastomer 2 | | | 100 | |
| Low-molecular-weight PP-1 | 5 | 10 | 5 | |
| Low-molecular-weight PP-2 | | | | 5 |
| Properties | | | | |
| Hardness (SHORE) | 60A | 65A | 42D | 60A |
| Tensile strength (kg/cm$^2$) (parallel direction) | 43 | 41 | 120 | 41 |
| Tensile strength (kg/cm$^2$) (vertical direction) | 50 | 48 | 120 | 59 |
| Elongation at break (%) (parallel direction) | 320 | 340 | 540 | 320 |
| Elongation at break (%) (vertical direction) | 410 | 380 | 580 | 430 |
| Compression set (%) | 22 | 21 | 49 | 21 |
| Resistance to oil (wt. %) | 116 | 121 | 50 | 110 |
| MFR (g/10 min) | 4 | 25 | 50 | 2 |
| Appearance | good | good | good | good |

TABLE B3

| | Comp. Ex. B1 | Comp. Ex. B2 | Comp. Ex. B3 | Comp. Ex. B4 | Comp. Ex. B5 |
|---|---|---|---|---|---|
| Formulation (parts by weight) | | | | | |
| Elastomer 1 | 100 | 100 | | | 100 |
| Elastomer 3 | | | 100 | | |
| Elastomer 4 | | | | 100 | |
| Low-molecular-weight | 1 | 50 | 5 | 5 | |

TABLE B3-continued

|  | Comp. Ex. B1 | Comp. Ex. B2 | Comp. Ex. B3 | Comp. Ex. B4 | Comp. Ex. B5 |
|---|---|---|---|---|---|
| PP-1 |  |  |  |  |  |
| Low-molecular-weight |  |  |  |  | 5 |
| PP-4 |  |  |  |  |  |
| Properties |  |  |  |  |  |
| Hardness (SHORE) | 56A | 79A | 60A | 64A | 61A |
| Tensile strength (kg/cm$^2$) (parallel direction) | 31 | 17 | 45 | 38 | 37 |
| Tensile strength (kg/cm$^2$) (vertical direction) | 60 | 20 | 68 | 50 | 61 |
| Elongation at break (%) (parallel direction) | 260 | 90 | 300 | 240 | 300 |
| Elongation at break (%) (vertical direction) | 450 | 110 | 400 | 290 | 450 |
| Compression set (%) | 20 | — | 18 | 20 | 19 |
| Resistance to oil (wt. %) | 105 | — | 90 | 80 | 108 |
| MFR (g/10 min) | 0.8 | — | 1.2 | 0.8 | 3.0 |
| Appearance | good | poor[1) ] | good | poor[1) ] | good |

(Note)
[1)] extremely rough surface

INDUSTRIAL APPLICABILITY

The thermoplastic elastomer compositions according to the present invention have the following advantages:

(1) moldable by ordinary methods for molding thermoplastic resins, and can easily provide moldings having good appearances;

(2) showing low anisotropy in mechanical properties when subjected to injection molding, and thus usable for moldings in various shapes; and (3) excellent in mechanical properties, shape recoverability, oil resistance and the like, and thus suitable for use in various fields which require these properties, in particular, in the field of parts of automobiles and industrial machines.

I claim:

1. An olefin thermoplastic elastomer composition prepared by subjecting a composition comprising
   (a) 100 parts by weight of an ethylene-α-olefin-non-conjugated diene copolymer rubber having a high molecular weight, the Mooney viscosity (ML 1+4, at 125° C.) of a composition consisting of 100 parts by weight of the copolymer rubber and 75 parts by weight of a mineral oil-type softening agent being 40 or more,
   (b) from 10 to 500 parts by weight of a crystalline ethylene-propylene block copolymer resin having a melt flow rate of 10 to 50,
   (c) from 3 to 300 parts by weight of a mineral oil-type softening agent, and
   (d) from 5 to 100 parts by weight of a low-molecular-weight propylene homopolymer resin having a number-average molecular weight of 2000 to 20000,
   the weight ratio of the low-molecular-weight propylene homopolymer resin to the crystalline ethylene-propylene block copolymer resin being 0.8 or less, to dynamic vulcanization using, as a vulcanizing agent, from 0.5 to 15 parts by weight of a reactive alkylphenol-formaldehyde resin to vulcanize the ethylene-α-olefin-non-conjugated diene copolymer rubber to a high degree so that the amount of non-vulcanized rubber in the composition is less than 5 weight percent, as determined by hot xylene extraction.

2. An olefin thermoplastic elastomer composition comprising 100 parts by weight of the below-defined first component, and from 2 to 30 parts by weight of the below-defined second component:
   first component: an olefin thermoplastic elastomer prepared by subjecting a composition comprising
   (a) 100 parts by weight of an ethylene-α-olefin-non-conjugated diene copolymer rubber having a high molecular weight, the Mooney viscosity (ML 1+4, at 125° C.) of a composition consisting of 100 parts by weight of the copolymer rubber and 75 parts by weight of a mineral oil-type softening agent being 40 or more,
   (b) from 10 to 500 parts by weight of a crystalline ethylene-propylene block copolymer resin having a melt flow rate of 10 to 50, and
   (c) from 3 to 300 parts by weight of a mineral oil-type softening agent to dynamic vulcanization using, as a vulcanizing agent, from 0.5 to 15 parts by weight of a reactive alkylphenol-formaldehyde resin to vulcanize the ethylene-α-olefin-non-conjugated diene copolymer rubber to a high degree so that the amount of non-vulcanized rubber in the composition is less than 5 weight percent, as determined by hot xylene extraction; and
   second component: (d) a low-molecular-weight propylene homopolymer resin having a number-average molecular weight of 2000 to 20000.

3. An olefin thermoplastic elastomer composition as claimed in claim 1 or claim 2, wherein the ethylene-α-olefin-non-conjugated diene copolymer rubber (a) is ethylene-propylene-ethylidenenorbornene copolymer rubber.

4. An olefin thermoplastic elastomer composition as claimed in claim 1 or claim 2, wherein the weight ratio of ethylene/α-olefin in the copolymer rubber (a) is from 60/40 to 80/20.

5. An olefin thermoplastic elastomer composition as claimed in claim 1 or claim 2, wherein the amount of the non-conjugated diene in the copolymer rubber (a) is from 10 to 20 as expressed by an iodine value.

6. An olefin thermoplastic elastomer composition as claimed in claim 1 or claim 2, wherein the reactive alkylphenol-formaldehyde resin as a vulcanizing agent is used in an amount of from 3 to 8 parts by weight for 100 parts by weight of the copolymer rubber (a).

7. An olefin thermoplastic elastomer composition as claimed in claim 1 or claim 2, wherein the dynamic vulcanization is conducted using an organic halide as a vulcanization accelerator together with the vulcanizing agent.

8. An olefin thermoplastic elastomer composition as claimed in claim 1 or claim 2, wherein the organic halide is selected from the group consisting of stannous chloride, ferric chloride, chlorinated polypropylene, butyl bromide rubber and chloroprene rubber.

9. An olefin thermoplastic elastomer composition as claimed in claim 3, wherein it is prepared by kneading at a temperature of 160° to 240° C. the olefin thermoplastic elastomer as the first component and the low-molecular-weight propylene homopolymer resin as the second component.

* * * * *